(12) United States Patent
Bachmann et al.

(10) Patent No.: US 7,895,203 B2
(45) Date of Patent: *Feb. 22, 2011

(54) METHOD FOR DEFERRED DELETION OF ENTRIES FOR A DIRECTORY SERVICE BACKING STORE

(75) Inventors: David W. Bachmann, Leander, TX (US); Terry L. Dunkle, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 471 days.

This patent is subject to a terminal disclaimer.

(21) Appl. No.: 11/935,534

(22) Filed: Nov. 6, 2007

(65) Prior Publication Data

US 2008/0077584 A1 Mar. 27, 2008

Related U.S. Application Data

(63) Continuation of application No. 09/303,356, filed on Apr. 29, 1999, now Pat. No. 7,313,581.

(51) Int. Cl.
*G06F 17/30* (2006.01)
(52) U.S. Cl. ...................................... 707/736; 707/813
(58) Field of Classification Search ................. 707/206, 707/5, 999.206, 999.005, 736
See application file for complete search history.

(56) References Cited

U.S. PATENT DOCUMENTS

| 3,585,601 | A |   | 6/1971  | Lahrson et al. |
| 3,670,310 | A |   | 6/1972  | Bharwani et al. |
| 4,648,036 | A |   | 3/1987  | Gallant |
| 5,247,658 | A |   | 9/1993  | Barrett et al. |
| 5,581,724 | A |   | 12/1996 | Belsan et al. |
| 5,778,378 | A |   | 7/1998  | Rubin |
| 5,813,000 | A | * | 9/1998  | Furlani ............................... 1/1 |
| 5,832,068 | A | * | 11/1998 | Smith .................... 379/114.14 |
| 5,842,196 | A | * | 11/1998 | Agarwal et al. ................. 707/2 |
| 5,881,241 | A |   | 3/1999  | Corbin |
| 5,983,231 | A |   | 11/1999 | Minatogawa et al. |
| 5,999,972 | A |   | 12/1999 | Gish |
| 6,038,590 | A |   | 3/2000  | Gish |

(Continued)

OTHER PUBLICATIONS

Joisha, "Compiler Optimizations for nondeferred reference", Counting Garbage Collection, International Symposium on Memory Management. pp. 150-161, 2006.

(Continued)

*Primary Examiner*—Charles Rones
*Assistant Examiner*—Yuk Ting Choi
(74) *Attorney, Agent, or Firm*—Yee & Associates, P.C.; Jeffrey S. LaBaw

(57) ABSTRACT

A method for deleting entries from a directory in which directory information is stored in a set of database tables begins upon a request to delete a directory entry. In response, the directory entry is tagged, preferably by setting the entry's creation time to a null value. If a search query is received thereafter, the routine excludes tagged entries from search results that would otherwise satisfy the search query. Periodically, the routine searches for tagged entries, and references to the tagged entries are then deleted throughout the set of database tables. Thus, the inventive method defers entry deletions to enable directory queries to be processed even if deleted entries have not yet been fully expunged from the directory.

15 Claims, 3 Drawing Sheets

| EID | PEID | OWNER | CREATION (68) | MODIFY (70) | ENTRY DATA | SIZE | OTHER |
|---|---|---|---|---|---|---|---|
| 3 | 1 | ON=IBM_US | 4:01 AM 1/7/97 | 6:30 AM 3/22/99 | "DN: ON=AUSTIN..." | 511 | 0 |
| 4 | 3 | ON=IBM_US C=US | 0 | 8:35 AM 3/22/99 | "DN: ON=DAVE..." | 632 | 0 |

U.S. PATENT DOCUMENTS

| | | | |
|---|---|---|---|
| 6,052,681 A * | 4/2000 | Harvey | 707/3 |
| 6,085,188 A | 7/2000 | Bachmann et al. | |
| 6,112,209 A | 8/2000 | Gusack | |
| 6,115,709 A * | 9/2000 | Gilmour et al. | 707/9 |
| 6,128,623 A | 10/2000 | Mattis et al. | |
| 6,134,582 A | 10/2000 | Kennedy | |
| 6,289,382 B1 * | 9/2001 | Bowman-Amuah | 709/226 |
| 6,304,876 B1 * | 10/2001 | Isip, Jr. | 1/1 |
| 6,347,312 B1 | 2/2002 | Byrne et al. | |
| 6,360,215 B1 | 3/2002 | Judd et al. | |
| 6,377,950 B1 | 4/2002 | Peters et al. | |
| 6,570,877 B1 | 5/2003 | Kloth et al. | |
| 6,584,466 B1 | 6/2003 | Serbinis et al. | |
| 6,671,705 B1 | 12/2003 | Duprey et al. | |
| 6,772,179 B2 | 8/2004 | Chen et al. | |
| 7,024,430 B1 | 4/2006 | Ingraham et al. | |
| 7,089,532 B2 | 8/2006 | Rubin | |
| 7,313,581 B1 * | 12/2007 | Bachmann et al. | 707/759 |
| 2001/0044792 A1 * | 11/2001 | Kikuchi et al. | 707/3 |
| 2001/0054031 A1 | 12/2001 | Lee et al. | |

OTHER PUBLICATIONS

Fradet, "Collecting More Garbage", Conference on LISP and Functional Programing, Proceeding of the 1994 ACM Conference and Functional Programming, pp. 24-33, 1994.

Heetz et al., "Quantifying the Performance of Garbage Collection vs. Explicit Memory Management", Conference on Object Oriented Programming Systems Languages and Applications, ACM: Association for Computing Machinary, pp. 313-326, 2005.

Kiskov et al., "Highly Available Distributed Services and Fault-tolerant Distributed Garbage Collection", Annual ACM Symposium on Principles of Distributed Computing, ACM Press, pp. 29-39, 1086.

Fessant et al., "An Implementation of Complete, Asynchronous, Distributed Garbage Collection", Conference Programming Language Design and Implementation, ACM Special Interest Group om Programming Languages, pp. 152-161, 1998.

Roy et al., "Garbage Collection in Object-oriented Databases Using Transactional Cycle Reference Counting ", The VLDB Journal-The International Journal on Very Large Data Bases, vol. 7, Issue 3, pp. 179-193, Aug. 1998.

Baker, "CONS should not CONS its Argument, or, a lazy Alloc is a smart Alloc", ACM SIGPLAN Notices, vol. 27, Issue 3, pp. 24-34, Mar. 1992.

Meyer, "A True Hardware read Barrier", Internal Symposium on Memory Management, ACM Press, pp. 3-16, 2006.

Abdullahi et al. "Garbage Collection the Internet", A Survey of Distributed Garbage Collection, ACM Computing Surveys (CSUR), AM Press, pp. 330-373, 1998.

Tel et al., "The Derivation of Distributed Termination Detection Algorithms for Garbage Collection Schemes", ACM Transactions on Programming Languages and Systems )TOPLAS), vol. 15, Issue 1, pp. 1-35, 1993.

* cited by examiner

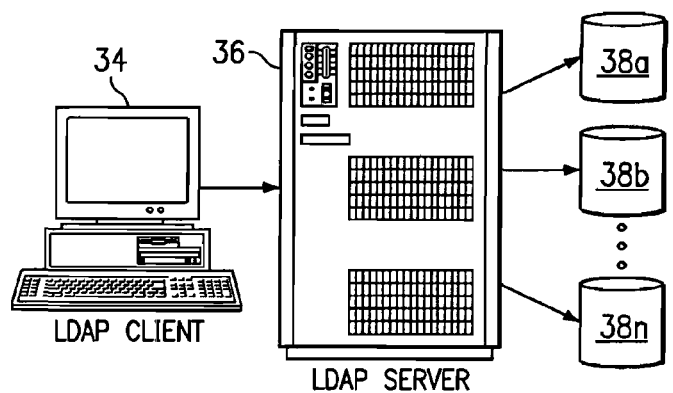
*FIG. 4A*
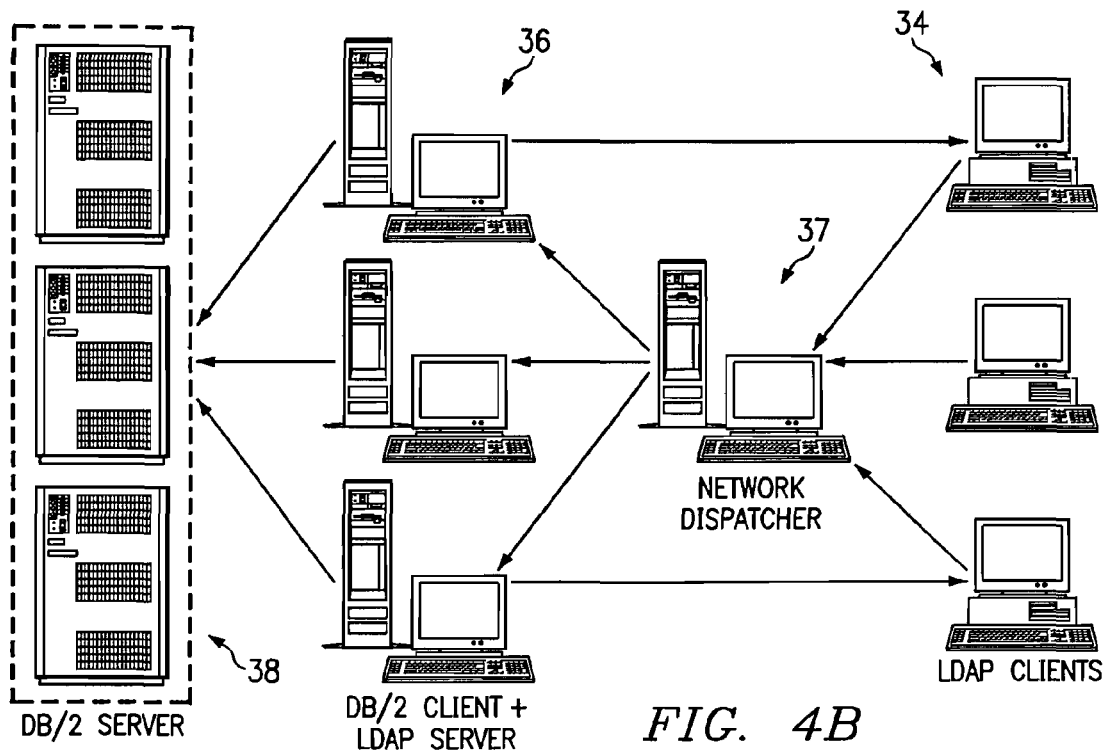
*FIG. 4B*
| EID | PEID | OWNER | CREATION | MODIFY | ENTRY DATA | SIZE | OTHER |
|---|---|---|---|---|---|---|---|
| 3 | 1 | ON=IBM_US C=US | 4:01 AM 1/7/97 | 6:30 AM 3/22/99 | "DN: ON=AUSTIN..." | 511 | 0 |
| 4 | 3 | ON=IBM_US C=US | 5:12 AM 4/3/98 | 7:10 AM 3/22/99 | "DN: ON= DAVE BACHMANN..." | 632 | 0 |
*FIG. 5*

| EID | PEID | OWNER | CREATION 68 | MODIFY 70 | ENTRY DATA | SIZE | OTHER |
|---|---|---|---|---|---|---|---|
| 3 | 1 | ON=IBM_US | 4:01 AM 1/7/97 | 6:30 AM 3/22/99 | "DN: ON=AUSTIN…" | 511 | 0 |
| 4 | 3 | ON=IBM_US C=US | 0 | 8:35 AM 3/22/99 | "DN: ON=DAVE…" | 632 | 0 |

METHOD FOR DEFERRED DELETION OF ENTRIES FOR A DIRECTORY SERVICE BACKING STORE

This application is a continuation of application Ser. No. 09/303,356, filed Apr. 29, 1999, now U.S. Pat. No. 7,313,581 status allowed.

BACKGROUND OF THE INVENTION

1. Technical Field

This invention relates generally to providing directory services in a distributed computing environment.

2. Description of the Related Art

A directory service is the central point where network services, security services and applications can form an integrated distributed computing environment. Typical uses of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information about users in a system composed of a number of interconnected machines. The central repository of user information enables a system administrator to administer the distributed system as a single system image. Still another directory service is a "white pages" lookup provided by some e-mail clients, e.g., Netscape Communicator, Lotus Notes, Endora and the like).

With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criteria of the search is specified in a search filter. The search filter typically is a Boolean expression that consists of qualifiers including attribute name, attribute value and Boolean operators like AND, OR and NOT. Users can use the filter to perform complex search operations. One filter syntax is defined in RFC 2254.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

In implementing an LDAP directory service with a relational database backing store, deleting an entry from the directory involves deleting rows from several different tables. In particular, in addition to the LDAP entry table, which stores an entry ID, parent ID, create and last modified times, together with the complete entry in string format, the schema includes a separate table for each attribute. When an entry is to be deleted, a global lock is placed on all of these tables (including the entry table and its associated attribute tables) until the delete is processed. As a result, all other query activity into the database is locked out for whatever time period is required for the backing store to return an indication that the delete operation has been completed. This is a very time consuming and computationally-intensive process.

BRIEF SUMMARY OF THE INVENTION

It is a primary object of this invention to reduce the time required to perform a delete operation in a directory service having a relational database backing store.

It is another object of the present invention to delete an entry from a directory without having to lock out all other query activity during the operation as is presently required by the prior art.

A further object of the invention is to reduce the apparent processing time required to delete an entry from a directory by deferring the actual deletion until execution of a cleanup handler thread.

It is thus object of the present invention to provide a simple and efficient technique for speeding up entry deletion by deferring the actual deletion of rows from a database, preferably until invocation of a cleanup routine.

A specific object of this invention is to provide a more efficient LDAP directory service having a relational database management system (DBMS) as a backing store.

A general object of this invention is to provide a reliable and scaleable enterprise directory solution, wherein a preferred implementation is LDAP using a DB/2 backing store.

The present invention overcomes the deficiencies of the prior art. When an entry is to be deleted, its entry in an entry table (e.g., the ldap_entry table) is tagged deleted, preferably by setting its creation time to a given value (e.g., a null value). This operation involves a change to only a single, unindexed field in a single row in a single table and, as a result, is quite efficient. At periodic intervals, a cleanup thread performs actual row deletions for any entry tagged as deleted. When searches are done in the directory, the invention preferably modifies the SQL query to exclude rows with a null change time, thus preventing deleted entries from being returned by the search.

In a preferred embodiment, a method for deleting entries from a directory in which directory information is stored in a set of database tables begins upon a request to delete a directory entry. In response, the directory entry is tagged, preferably by setting the entry's creation time to a null value. If a search query is received thereafter, the method excludes tagged entries from search results that would otherwise satisfy the search query. At a periodic interval, the routine searches for tagged entries, and references to the tagged entries are then deleted throughout the set of database tables. Thus, the inventive method defers entry deletions to enable directory queries to be processed even if deleted entries have not yet been fully expunged from the directory.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIGS. 4A-4B show representative LDAP directory service implementations having relational database backing store;

FIG. 5 is a representative LDAP entry table prior to being modified in accordance with the present invention;

DETAILED DESCRIPTION OF THE PREFERRED EMBODIMENT

Figure 1:
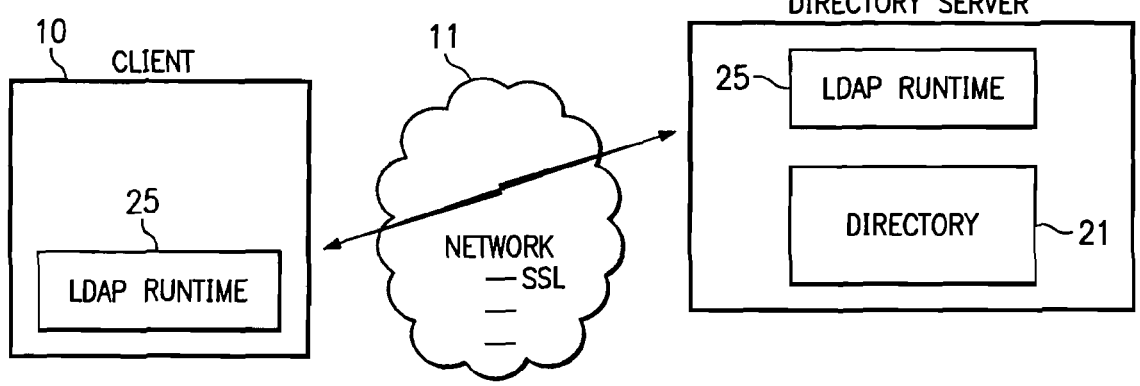
FIG. 1 is a representative LDAP directory service implementation.
Figure 2:
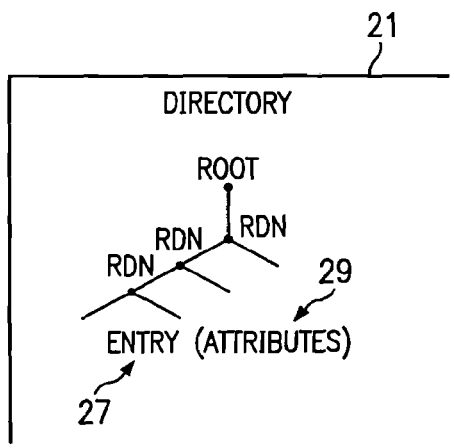
FIG. 2 is a simplified LDAP directory.

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 2. Each of the client and server machines further include a directory runtime component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation. Entries are stored in a given table (e.g., ldap_entry) that includes entry IDs, parent IDs, a create and last modified timestamp, together with the complete entry in string format. Each attribute has an associated attribute table.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the scope supported by LDAP search are: base, one level and subtree. LDAP does not support search for arbitrary tree levels and path enumeration.

Figure 3:
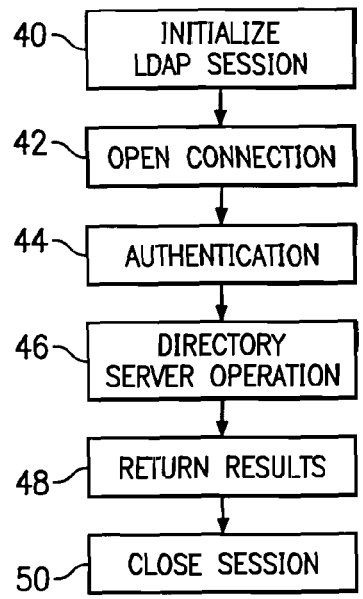
FIG. 3 is a flowchart of an LDAP directory session.

LDAP includes an application programming interface (API), as described in "The C LDAP Application Program Interface", IETF Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init( ) returns a handle to the client, and this handle may allow multiple connections to be open at one time. At step 44, the client authenticates to the LDAP server using, for example, an API ldap_bind( ) function. At step 46, one or more LDAP operations are performed. For example, the API function ldap_search( ) may be used to perform a given directory search. At step 48, the LDAP server returns the results of the directory search, e.g., one or more database elements that meet the search criteria. The session is then closed at step 50 with the API ldap_unbinds function then being used to close the connection.

It may be desirable to store LDAP directory data in a backing store. FIGS. 4A-4B illustrates several representative LDAP directory service implementations that use a relational database management system (RDBMS) for this purpose. These systems merely illustrate possible LDAP directory services in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4A, an LDAP client 34 can connect to a number of networked databases 38a-58n through an LDAP server 36. The databases 38a-38n contain the directory information. However, from the user's perspective, the LDAP server 36 stores all the information without knowing the database 38 in which the data is actually located. With this configuration, the LDAP server 36 is freed from managing the physical data storage and is able to retrieve information from multiple database servers 38 which work together to form a huge data storage.

FIG. 4B illustrates a multiple client/multiple server LDAP/DB2 enterprise solution. In this environment, a DB/2 client preferably runs on each LDAP server 36. Each such DB/2 client can connect to any database server 38 containing directory information. The collection of database servers 38a-38n form a single directory system image, and one or more of the LDAP servers 36 can access such information. Because all the LDAP servers 36 see the same directory image, a network dispatcher 37 may be deployed to route requests among the LDAP servers 36.

One of ordinary skill should appreciate that the system architectures illustrated in FIGS. 4A-4B are not to be taken as limiting the present invention. The inventive technique may be used to search any relational database using hierarchical, filter-based database queries. The present invention is a method for deferred deletion of entries in a directory service backing store. In LDAP, an entry is deleted using an SQL statement. In the prior art, the directory server responds to the delete entry statement by instituting a global lock on the database tables to ensure that data in those tables cannot be modified while the entry is being deleted from the directory. The present invention provides an enhanced delete operation whereby the entry is simply marked for deletion at a later time. This deferred entry deletion routine is now described in more detail below.

Figures 6, 7:
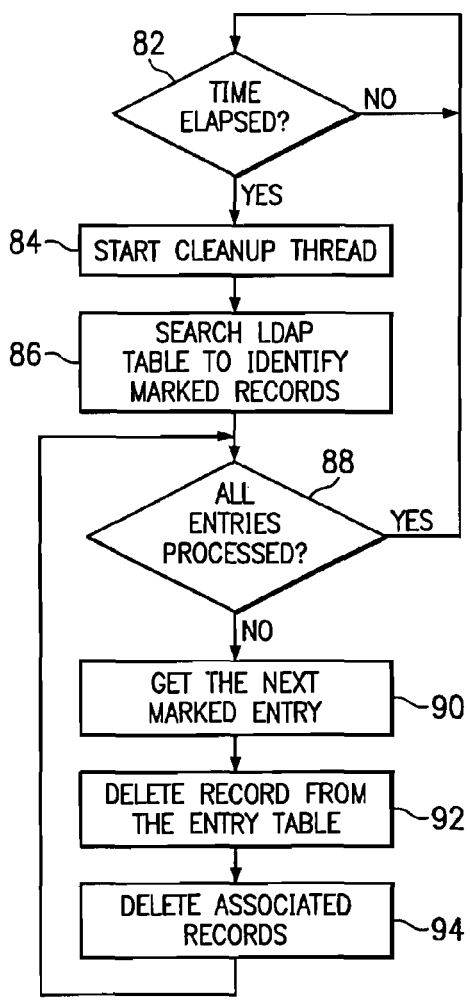
FIG. 6 is the LDAP entry table of FIG. 5 after being modified to mark a given entry as deleted in accordance with the invention.
FIG. 7 is a simplified flowchart of the inventive cleanup handler routine for deleting tagged entries in the entry and attribute tables.

By way of brief background, FIG. 5 illustrates a representative portion of the entry table 60 (e.g., ldap_entry). This table comprises a number of columns including the entry identifier (EID) 62, the parent identifier (PEID) 64, the owner 66, the creation date 68, the last modified date 70, the actual entry data 72 (in a string format), the entry size 74, and additional information 76. In this example, each of the entries has a given creation date. According to the invention, when a user requests deletion of an entry, the creation date for that entry is set to a given null value. FIG. 6 illustrates this operation after the user has requested deletion of entry 4. As can be seen, the null value is present in the creation data column 68, and the timestamp for the last modified date 70 is updated to reflect when the delete request was received. At this point, the entry is conditionally deleted, even though the data for this entry remains in the entry table (as well as in the attribute tables).

Thus, according to the invention, when an entry is to be deleted, its entry in an entry table is tagged as deleted, preferably by setting its creation time to a given value (e.g., a null value). As illustrated in FIGS. 5-6, this operation involves a change to only a single, unindexed field in a single row in a single table and, as a result, is quite efficient. At periodic intervals, a cleanup thread is then used to perform actual row deletions for any entry tagged as deleted. This operation is illustrated in the flowchart of FIG. 7. The thread begins at step 82 to test whether a given time period has expired. If not, the thread cycles. If, however, the time period has expired, the thread continues at step 84 to start the cleanup thread. At step 86, the thread searches the LDAP table to identify records marked for deletion. The routine then continues at step 88 to test whether all entries have been processed. If so, the routine routines to step 82. If, however, the routine has not processed all marked entries, the routine continues at step 90 to get the next marked entry. At step 92, the routine deletes the record from the entry table. At step 94, the routine deletes all associated records in the attribute tables. Control then returns back to step 88 and the process repeats as needed.

Because entries are merely marked for deletion, the present invention also includes a routine for processing directory search queries into the modified entry table. Thus, as compared to the prior art, the present invention enables a user to perform search and other queries into the directory despite the existence of the entries tagged for deletion. This operation preferably is achieved by modifying the SQL statements to exclude rows with a null change time, thus preventing deleted entries from being returned by the search. This operation is illustrated below.

By way of brief background, the following is a representative SQL query searching for sn=Bachmann:

SELECT distinct EDIR.LDAP_entry.EID from EDIR.LDAP_entry, EDIR.LDAP_DESC where (EDIR.LDAP_entry.EID=EDIR.LDAP_DESC.DEID and EDIR.LDAP_DESC.AEID 6142) and EDIR.LDAP_entry.EID in (select EID from EDIR.SN where SN=BACHMANN)).

According to the present invention, the above query is modified to ignore entries marked as deleted, preferably as follows:

SELECT distinct EDIR.LDAP_entry.EID from EDIR.LDAP_entry, EDIR.LDAP_DESC, where (EDIR.LDAP_entry.EID EDIR.LDAP_DESC.DEID and EDIR.LDAP.DESC.AEID=6142) and EDIR.LDAP_entry.EID in (Select EID from EDIR.SN where SN=Bachmann) and EDIR.LDAP_entry.Create.Timestamp< >Ø).

As can be seen, the last clause of the SQL statement looks for entries that have their creation timestamp as non-zero. This operation prevents deleted entries from being returned by the search.

As previously described, at periodic intervals, the routine tests to determine which records have been marked for deletion. This was step 76 in FIG. 7. A representative SQL query to find records marked for deletion is then as follows:

Select distinct EDIR.LDAP_entry EID from EDIR.LDAP_entry, where Create-Timestamp=Ø.

Thus, according to a preferred embodiment, a method for deleting entries from a directory in which directory information is stored in a set of database tables begins upon a request to delete a directory entry. In response, the directory entry is tagged, preferably by setting the entry's creation time to a null value. If a search query is received thereafter, the method excludes tagged entries from search results that would otherwise satisfy the search query. At a periodic interval, the routine then periodically searches for tagged entries, and references to the tagged entries are then deleted throughout the set of database tables. Thus, the inventive method defers entry deletions to enable directory queries to be processed even if deleted entries have not yet been fully expunged from the directory.

The inventive scheme preferably takes advantage of several LDAP table structures that are now described below.

Entry Table:

This table holds the information about a LDAP entry. This table is used for obtaining the EID of the entry and supporting LDAP_SCOPE_ONELEVEL and LDAP_SCOPE_BASE search scope.

EID. The unique identifier of the LDAP entry. This field is indexed.

PEID. The unique identifier of a parent LDAP entry in the naming hierarchy.

EntryData. Entries are stored using a simple text format of the form attribute: value. Non-ASCII values or values that are too long to fit on a reasonable sized line are represented using a base 64 encoding. Giving an ID, the corresponding entry can be returned with a single SELECT statement.

Descendant Table:

The purpose of this table is to support the subtree search feature of LDAP. For each LDAP entry with an unique ID (AEID), this table contains the descendant entries unique identifiers (DEID). The columns in this table are:

AEID. The unique identifier of the ancestor LDAP entry. This entry is indexed.

DEID. The unique identifier of the descend LDAP entry. This entry is indexed.

Attribute Table:

One table per searchable attribute. Each LDAP entry is assigned an unique identifier (EID) by the backing store. The columns for this table are:

EID

Attribute value

Thus, in the parent table, the EID field is the unique identifier of an entry in the LDAP naming hierarchy. The PEID field is the unique identifier of the parent entry in the naming hierarchy. In the descendant table, the AEID field is the unique identifier of a ancestor LDAP entry in the LDAP naming hierarchy. The DEID field is the unique identifier of the descend LDAP entry.

In addition to the table structures described above, the following SQL SELECT statements are used by LDAP/DB2 search routines:

```
Base Level Search:
        SELECT entry.EntryData,
            from ldap_entry as entry
                where entry.EID in (
    select distinct ldap_entry.EID
    from -table list-
    where (ldap_entry.EID=-root dn id- )
        -sql where expressions-)
One Level Search:
        SELECT entry.EntryData,
            from ldap_entry as entry
    ldap_entry.EID
            from ldap_entry, -table
    list-
    ldap_entry as pchild, -list of tables-
    where ldap_entry.EID=pchild.EID
    AND pchild.PIED=-root dn id-
        -sql where expressions-)
Subtree Search
        SELECT entry.EntryData,
            from ldap_entry as entry
                where entry.EID in (
    select distinct ldap_entry.EID
    from ldap_entry, ldap_desc, -table list-
    where
        (LDAP_ENTRY.EID=ldap_desc.DEID AND
            ldap_desc.AEID=-root dn id-)
    ldap_entry as pchild. -table list-
    where ldap_entry.EID=ldap_desc.EID
    AND ldap_desc.AEID=%d -where expressions-).
```

In the above representation, -table list- and -where expression- are the two null terminated strings returned by the SQL generator. The -root dn id- is the unique identifier of the root dn. The where clause should only be generated if -where expression- is not the empty string and no errors where detected in the parsing the LDAP filter.

As noted above, the invention may be implemented in any hierarchical directory service in which a relational database management system (RDBMS) is used to provide a backing store function. Thus, for example, the principles of the invention may be carried out in an X.500 directory service or hereinafter-developed LDAP implementations. The SQL query generated according to the present invention is used to access the relational database, and results are then returned in response to this query. The invention may also be implemented within a relational database management system being used as an add-on to a directory service. One of ordinary skill will appreciate that the invention can be applied to any relational database management system (RDBMS) and not simply DB/2, the implementation described above. Thus, for example, the relational database may be Oracle, Sybase or any other third party supplied backing store. In addition, the EID sets approach can also be applied to b-tree based LDAP server implementation.

Moreover, although the preferred embodiment has been described in the context of deleting an LDAP entry in a relational database backing store, the inventive technique should be broadly construed to extend to deleting entries from any type of directory in which directory information is stored in a set of database tables. Thus, the present invention is not limited to use with hierarchical directories. Rather, as noted above, the techniques described herein may be implemented in conjunction with any higher level directory structure in which information is spread out over a set of tables.

One of the preferred embodiments of the routine of this invention is as a set of instructions (e.g., computer program code) in a code module resident in or downloadable to the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by Letters Patent is set forth in the following claims.

The invention claimed is:

1. A method, in a data processing system, for searching a database from a directory service, comprising the steps of:
receiving a search query at the data processing system for a directory, wherein the directory service is a Lightweight Directory Access Protocol (LDAP) directory service and the database is managed by a relational management service;
responsive to a search by the data processing system for directory entries that satisfy the search query, excluding given entries from search results that otherwise satisfy the search query to form modified search results, wherein the given entries identify database entries that have been tagged for deletion by setting a creation time of the directory entry to a predetermined value; and
returning, by the data processing system, the modified search results.

2. The method as described in claim 1, wherein the predetermined value is a null value.

3. The method as described in claim 1, wherein database entries that have been tagged for deletion are tagged in a first database table of a set of database tables that comprise the database, and wherein the first database table is an entry table.

4. The method as described in claim 3 wherein the set of database tables includes at least one attribute table storing information about an attribute.

5. The computer implemented method of claim 1, wherein excluding tagged directory entries includes modifying an SQL query to exclude rows having a null change creation.

6. A computer program product in a computer-readable storage medium for searching a database from a directory service, comprising:
instructions for receiving a search query for a directory, wherein the directory service is a Lightweight Directory Access Protocol (LDAP) directory service and the database is managed by a relational management service;
instructions, responsive to a search for directory entries that satisfy the search query, for excluding given entries from search results that otherwise satisfy the search query to form modified search results, wherein the given entries identify database entries that have been tagged for deletion by setting a creation time of the directory entry to a predetermined value; and instructions for returning the modified search results.

7. The computer program product of claim 6, wherein the predetermined value is a null value.

8. The computer program product as described in claim 6, wherein database entries that have been tagged for deletion are tagged in a first database table of a set of database tables that comprise the database, and wherein the first database table is an entry table.

9. The computer program product as described in claim 8 wherein the set of database tables includes at least one attribute table storing information about an attribute.

10. The computer program product of claim 6, wherein the instructions for excluding tagged directory entries includes instructions for modifying an SQL query to exclude rows having a null change creation.

11. A directory service, comprising:
   a bus;
   a communications unit connected to the bus;
   a storage device connected to the bus, wherein the storage device includes computer usable program code;
   a directory organized as a naming hierarchy having a plurality of entries each represented by a unique identifier, wherein the directory is compliant with the Lightweight Directory Access Protocol (LDAP);
   a relational database management system having a backing store for storing directory data in a set of database tables; and
   a processor unit connected to the bus, wherein the processor unit executes the computer usable program code to receive a search query for a directory, wherein the directory service is a Lightweight Directory Access Protocol (LDAP) directory service and the database is managed by a relational management service;
   responsive to a search for directory entries that satisfy the search query, exclude given entries from search results that otherwise satisfy the search query to form modified search results, wherein the given entries identify database entries that have been tagged for deletion by setting a creation time of the directory entry to a predetermined value; and return the modified search results.

12. The directory service as described in claim 11 wherein the predetermined value is a null value.

13. The directory service as described in claim 11, wherein database entries that have been tagged for deletion are tagged in a first database table of a set of database tables that comprise the database, and wherein the first database table is an entry table.

14. The directory service as described in claim 13 wherein the set of database tables includes at least one attribute table storing information about an attribute.

15. The directory service of claim 11, wherein the processor executing computer useable program code to exclude tagged directory entries further comprises the processor executing computer useable program code to modify an SQL query to exclude rows having a null change creation.

* * * * *